United States Patent
Izume et al.

(10) Patent No.: US 7,095,902 B2
(45) Date of Patent: Aug. 22, 2006

(54) IMAGE PROCESSING APPARATUS, IMAGE PROCESSING METHOD, AND PROGRAM PRODUCT

(75) Inventors: Rieko Izume, Sakai (JP); Takehiro Katoh, Nara (JP)

(73) Assignee: Minolta Co., Ltd., Osaka (JP)

( * ) Notice: Subject to any disclaimer, the term of this patent is extended or adjusted under 35 U.S.C. 154(b) by 623 days.

(21) Appl. No.: 10/097,323

(22) Filed: Mar. 14, 2002

(65) Prior Publication Data

US 2002/0159652 A1  Oct. 31, 2002

(30) Foreign Application Priority Data

Mar. 19, 2001 (JP) .............................. 2001-078221

(51) Int. Cl.
  *G06K 9/40*  (2006.01)
  *G06K 15/00*  (2006.01)
(52) U.S. Cl. ..................... 382/266; 358/3.27
(58) Field of Classification Search ................ 382/167, 382/169, 260, 269, 274, 275, 266, 263; 358/1.2, 358/3.26, 3.27, 518–520, 463
See application file for complete search history.

(56) References Cited

U.S. PATENT DOCUMENTS

| | | | |
|---|---|---|---|
| 4,665,437 A * | 5/1987 | Nicholson | 348/449 |
| 4,740,833 A * | 4/1988 | Shiota et al. | 358/518 |
| 5,278,668 A * | 1/1994 | Shinohara et al. | 358/451 |
| 5,523,861 A * | 6/1996 | Tanaka et al. | 358/475 |
| 5,740,267 A * | 4/1998 | Echerer et al. | 382/132 |
| 5,926,562 A * | 7/1999 | Hyodo et al. | 382/167 |
| 5,974,190 A | 10/1999 | Maeda et al. | 382/255 |
| 6,215,561 B1 * | 4/2001 | Kakutani | 358/1.9 |
| 6,480,300 B1 * | 11/2002 | Aoyama | 358/1.9 |
| 6,724,943 B1 * | 4/2004 | Tsuchiya et al. | 382/261 |

FOREIGN PATENT DOCUMENTS

| | | |
|---|---|---|
| JP | 03-064169 A | 3/1991 |
| JP | 05-080713 A | 4/1993 |
| JP | 05-176201 A | 7/1993 |
| JP | 06-030300 A | 2/1994 |
| JP | 06-030303 A | 2/1994 |
| JP | 06-253177 A | 9/1994 |
| JP | 07-143359 A | 6/1995 |
| JP | 08-139969 A | 5/1996 |
| JP | 11-032236 (A) | 2/1999 |
| JP | 2000-115539 (A) | 4/2000 |
| JP | 2000-338922 A | 12/2000 |

* cited by examiner

*Primary Examiner*—Daniel Mariam
(74) *Attorney, Agent, or Firm*—Sidley Austin LLP

(57) ABSTRACT

An image signal output from a CCD is input to an edge emphasis adjusting unit. A scene determining unit determines a scene of an image to be processed on the basis of an operation of selecting a shooting mode or the like. A tone characteristic control unit performs a control of selecting a tone characteristic used in a tone converting unit for edge emphasis on the basis of the scene determination result. A plurality of tone characteristics for edge emphasis are prepared, and have different luminance ranges in which a γ value changes. After the tone converting process for edge emphasis, an edge emphasizing process is performed by an edge emphasizing unit, and the tone conversion according to the monitor characteristic is performed in a tone converting unit for correction.

16 Claims, 12 Drawing Sheets

F I G . 7

| SCENE | EDGE EMPHASIZING PROCESS (THE DEGREE OF EMPHASIS AT EACH LUMINANCE LEVEL) | | | TONE CHARACTERISTIC FOR EDGE EMPHASIS |
|---|---|---|---|---|
| | LOW LUMINANCE PART | INTERMEDIATE LUMINANCE PART | HIGH LUMINANCE PART | |
| PORTRAIT | LOW | LOW | LOW | $\gamma$ IS CONSTANT IRRESPECTIVE OF LUMINANCE LEVEL |
| LANDSCAPE | HIGH | HIGH | HIGH | $\gamma$ VARIES AT LOW, INTERMEDIATE, AND HIGH LUMINANCE LEVELS |
| NIGHT VIEW | LOW | HIGH | HIGH | $\gamma$ VARIES AT INTERMEDIATE AND HIGH LUMINANCE LEVELS |
| SLOW SYNCHRO | LOW | HIGH | HIGH | $\gamma$ VARIES AT INTERMEDIATE AND HIGH LUMINANCE LEVELS |
| MACRO | HIGH | HIGH | HIGH | $\gamma$ VARIES AT LOW, INTERMEDIATE, AND HIGH LUMINANCE LEVELS |
| CHARACTER MODE | HIGH | HIGH | HIGH | $\gamma$ VARIES AT LOW, INTERMEDIATE, AND HIGH LUMINANCE LEVELS |

F I G . 1 0
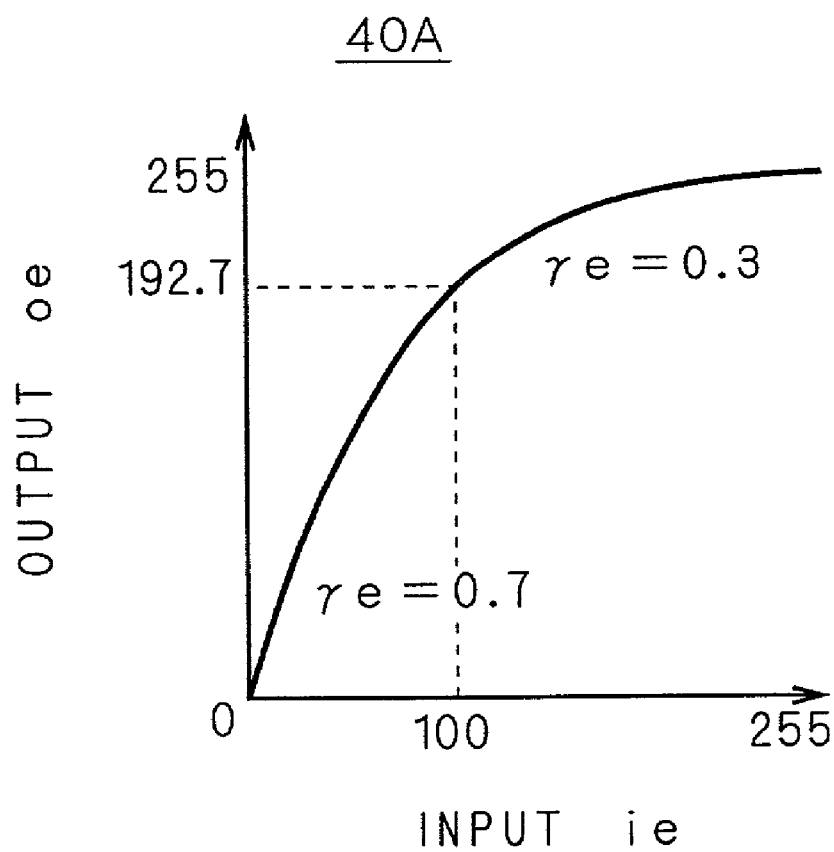
F I G . 1 1
| −1 | 3 | −1 |

F I G . 1 2
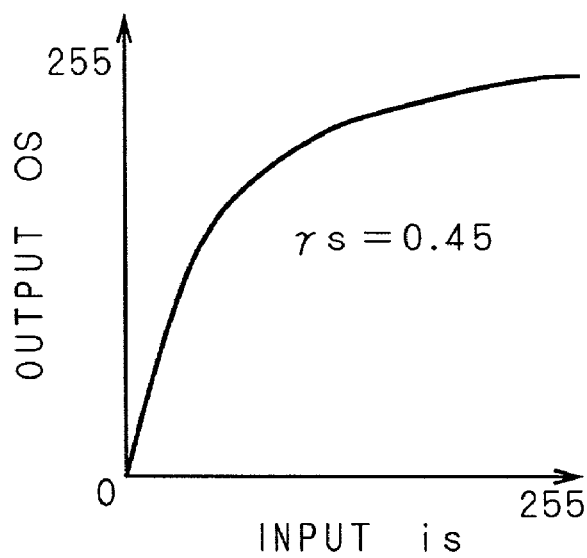
F I G . 1 3
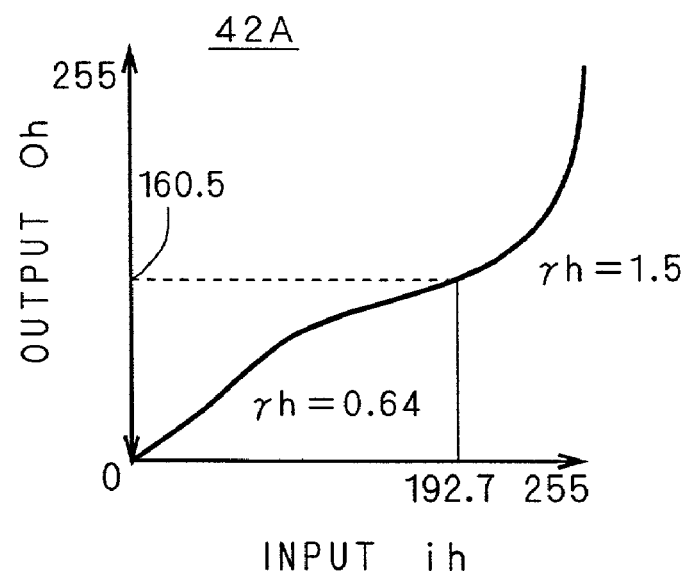

F I G. 14A
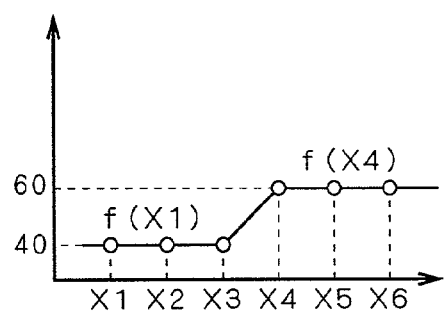
F I G. 14B
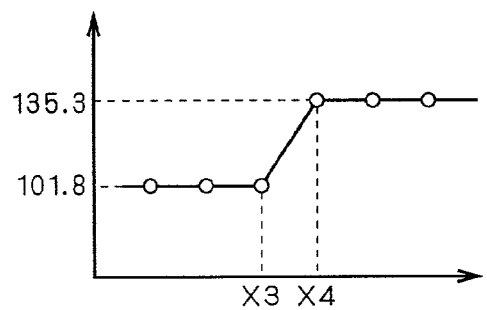
F I G. 14C
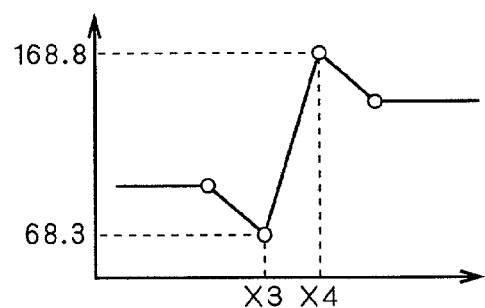
F I G. 14D
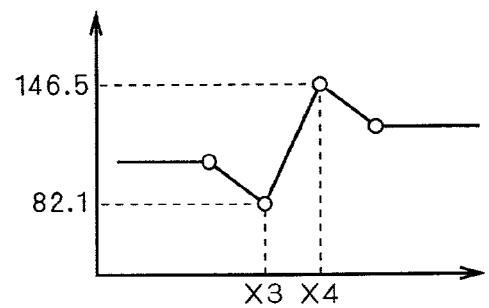

IMAGE PROCESSING APPARATUS, IMAGE PROCESSING METHOD, AND PROGRAM PRODUCT

This application is based on application No. 2001-078221 filed in Japan, the contents of which are hereby incorporated by reference.

BACKGROUND OF THE INVENTION

1. Field of the Invention

The present invention relates to an image processing apparatus and method for performing tone conversion and edge emphasis.

2. Description of the Background Art

A tone converting process and an edge emphasizing process are performed on an image captured by a digital camera and an image input to a computer by using predetermined hardware or software.

The tone converting process is a process of correcting the tone of an image in accordance with characteristics of a monitor, and the conversion characteristic is expressed by a γ (gamma) value. A general tone converting process is a converting process in which a γ value as the conversion characteristic is a constant value in a range from a shadow portion via a neutral portion to a highlight portion, and an output signal y to an input signal x is expressed as $y=x^\gamma$.

The edge emphasizing process is performed by, for example, detecting and extracting a signal of a high frequency component from G (green) data of an image to be processed, and adding the extracted signal of the high frequency component to image signals of R, G, and B.

In an image processing apparatus such as a digital camera or the like, generally, first, the tone converting process is performed on input image data and, after that, the edge emphasizing process is carried out on the tone-converted image data.

As described above, the image processing apparatus such as a digital camera can output image data subjected to the tone converting process and the edge emphasizing process. In the above processing method, however, similar edge emphasis is performed in the range from the shadow portion to the highlight portion of an input image. Therefore, it cannot be said that an optimum edge emphasizing process is performed according to the input image.

For example, if an image captured by a digital camera is an image captured by macro shooting, it is preferable to enhance the edge emphasis as a whole. If the image is an image of night view, a dark portion is large, so that it is necessary to remove noise in a low luminance portion.

In Japanese Unexamined Patent Application No. 2000-115539, density determination is made, and the degree of emphasizing an edge is changed according to density. However, since the density determination is made, there is a problem such that processing time is long.

In Japanese Unexamined Patent Application No. 11-32236, luminance determination is not performed but a backlight scene is determined. In the case of a backlight scene, the degree of edge emphasis is suppressed. However, since the degree of edge emphasis is unconditionally adjusted irrespective of the luminance, there is a problem such that sharpness of a whole image deteriorates.

SUMMARY OF THE INVENTION

The present invention is directed to an image processing apparatus.

According to the invention, this apparatus has (a) a first tone converter for performing tone conversion on an input image, (b) an edge emphasizing unit for controlling a degree of emphasis on an edge portion in an image subjected to the tone conversion by the first tone converter, and (c) a second tone converter for performing tone conversion on the image subjected to a control of the degree of emphasis on the edge portion performed by the edge emphasizing circuit. Consequently, different tone characteristics can be used in the tone conversion exerting an influence on the edge emphasizing process and the tone conversion exerting an influence on an output of a final image.

In a preferred embodiment of the invention, in the image processing apparatus, the first tone converter switches the gamma values in a luminance range in which the degree of emphasis on the edge portion is to be increased. Thus, edge emphasis can be placed according to an image to be processed.

The invention is also directed to an image processing method and a program product.

An object of the invention is, therefore, to provide an image processing technique capable of performing optimum edge emphasis on an input image without deteriorating processing speed.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram showing the relations among shooting mode of the digital camera, the degree of edge emphasis, and tone characteristic.

FIG. 8A shows the tone conversion characteristic that the γ value is constant,

FIG. 8B shows the tone conversion characteristic that the γ value changes in low, intermediate, and high luminance portions, and FIG. 8C shows the tone conversion characteristic that the γ value changes in the intermediate and high luminance portions.

FIG. 10 is a diagram showing an example of a tone conversion characteristic used in a comparison calculating process.

FIG. 11 is a diagram showing a spatial filter in the edge emphasizing unit.

FIG. 12 is a diagram showing the tone conversion characteristic of a final image.

FIG. 13 is a diagram showing an example of a tone conversion characteristic for correction.

FIGS. 14A to 14D are diagrams showing a process of edge calculation using first sample data.

DESCRIPTION OF THE PREFERRED EMBODIMENTS

Embodiments of the invention will be described hereinbelow with reference to the drawings.

<1. Configuration of Digital Camera>

Figure 1:
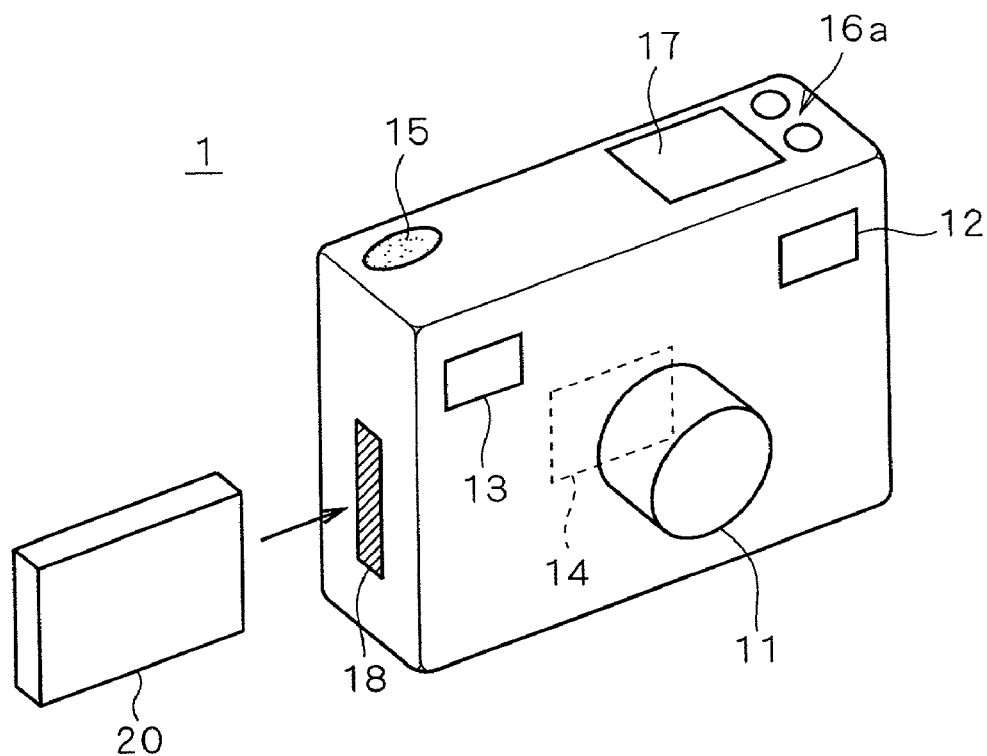
FIG. 1 is a schematic perspective view of a digital camera according to a preferred embodiment.
Figure 2:
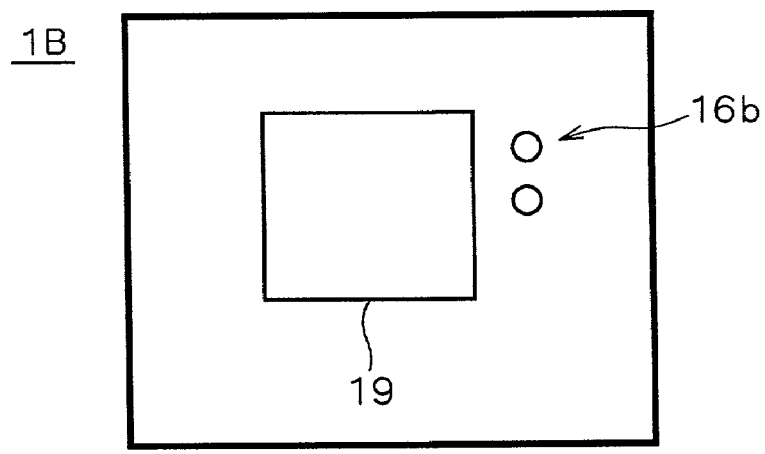
FIG. 2 is a rear view of the digital camera.

An image processing apparatus according to an embodiment will be described by using a digital camera as an example. FIG. 1 is a front perspective view of a digital camera 1. FIG. 2 is a rear view of the digital camera 1.

In the front face of the digital camera 1, a lens 11, a finder 12, and a flash 13 are provided. An image of a subject input from the lens 11 is formed on a CCD 14.

In the top face of the digital camera 1, a release button 15, setting keys 16a by which an operation of selecting a shooting mode, an operation of setting an exposure condition, an operation of switching white balance, exposure correction, and the like, can be performed and a liquid crystal panel 17 for displaying a state such as a shooting mode are provided.

In a side face of the digital camera 1, a slot 18 as an insertion port of a recording medium is provided. By inserting a memory card 20 into the slot 18, image data captured by the digital camera 1 can be transferred.

On the rear face 1B of the digital camera 1, setting keys 16b by which various setting operations such as an operation of selecting a shooting mode can be performed, and a liquid crystal monitor 19 for displaying a preview of a captured image, various setting menus, and the like are provided. In the following description, the setting keys 16a and 16b will be generically called setting keys 16.

Figure 3:
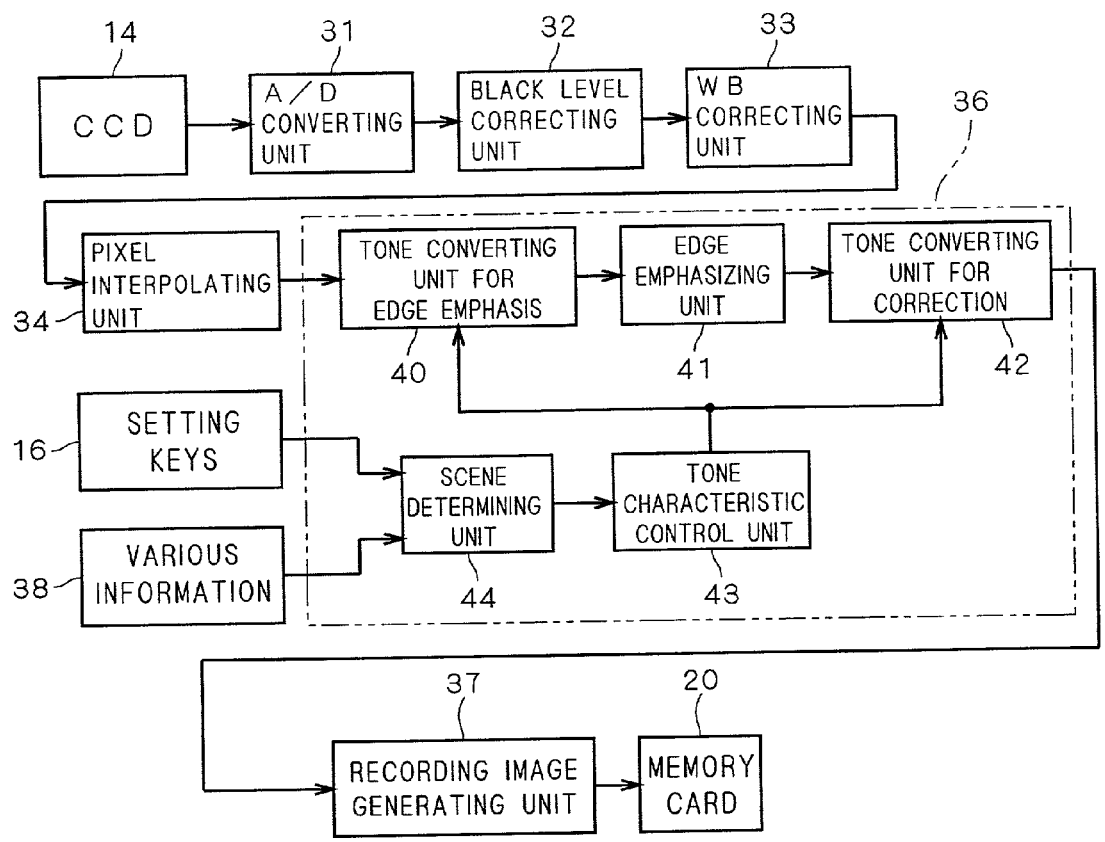
FIG. 3 is a block diagram showing the internal configuration of the digital camera.

The internal configuration of the digital camera 1 will now be described with reference to FIG. 3. The CCD 14 is an image pickup device in which color filters of the primary colors or complementary colors are arranged pixel by pixel, photoelectrically converts a light image of the subject into image signals of RGB, and outputs the image signals.

An A/D converting unit 31 converts an electric signal of each pixel output from the CCD 14 into a digital signal. A black level correcting unit 32 corrects the lowest luminance part of the pixel signals to the black level as a reference. A white balance (WB) correcting unit 33 performs level shifting of the pixel signals of the RGB colors to correct a shift in color balance caused by a spectrum of a light source of shooting. In a pixel interpolating unit 34, a dropped-out color pixel is interpolated, and the electric signals of three colors of RGB per pixel are output.

An edge emphasis adjusting unit 36 is an image processing unit as a feature portion of the invention, and has an edge emphasizing unit 41, a tone converting unit 40 for edge emphasis which converts tone prior to an edge emphasizing process, and a tone converting unit 42 for correction which converts tone after the edge emphasizing process.

Figure 4:
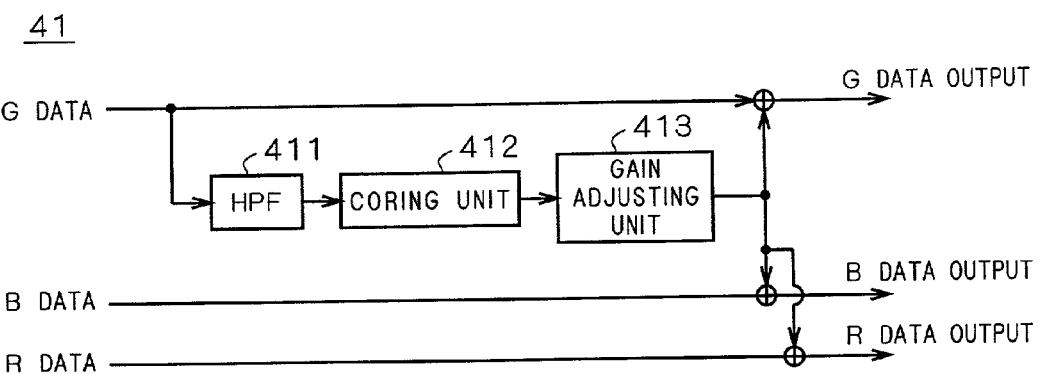
FIG. 4 is a block diagram showing the process of an edge emphasizing unit.

The edge emphasizing unit 41 includes an HPF (High Pass Filter) 411, a coring unit 412, and a gain adjusting unit 413 and performs edge emphasis. The configuration of the edge emphasizing unit 41 is shown in FIG. 4.

G data out of input RGB data is passed to the HPF 411 where high frequency components are extracted. From the high frequency components extracted in the HPF 411, components at a predetermined level or lower are removed (noise removal) by the coring unit 412. The high frequency components output from the coring unit 412 are subjected to gain adjustment by the gain adjusting unit 413.

The gain-adjusted high frequency components of the G data are added to the original G data, and the resultant G data is output. Further, the gain-adjusted high frequency components of the G data are also added to B and R data, and the resultant B and R data are output. In such a manner, by using the high frequency components of G, the edge emphasizing process is performed.

Figure 5:
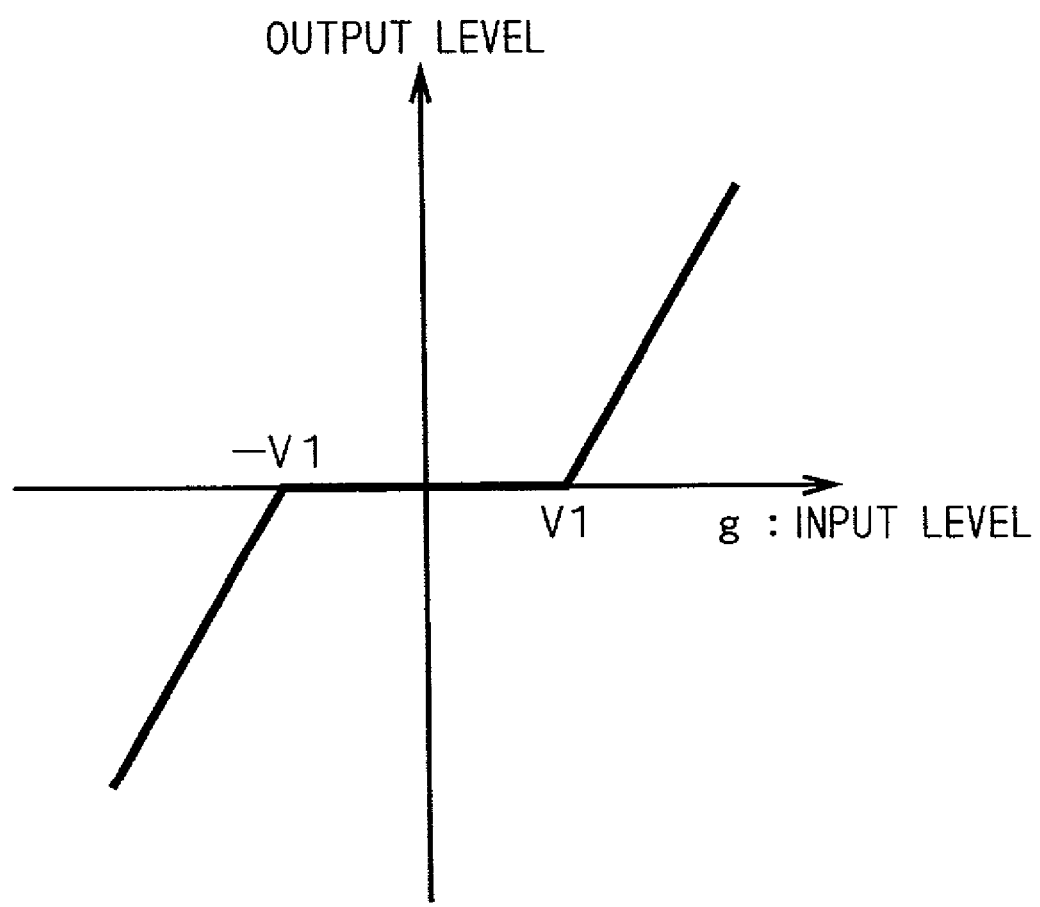
FIG. 5 is a diagram showing an output level controlled by a coring unit and a gain adjusting unit.

FIG. 5 shows the process characteristics of the coring unit 412 and gain adjusting unit 413 in the embodiment. In the drawing, the horizontal axis indicates the level when a value output from the HPF 411 is used as an input, and the vertical axis indicates the level of an output after the processes in the coring unit 411 and gain adjusting unit 413 are performed.

When the value "g" of the G data output from the HPF 411 satisfies the relation $-V1<g<V1$, the coring unit 412 converts the value to 0. In the other cases, the coring unit 412 outputs the level as it is. The gain adjusting unit 413 performs conversion with a gradient as shown in the drawing in accordance with the level output from the coring unit 412. That is, when the level output from the HPF 411 lies in the range from $-V1$ to $V1$, the coring unit 412 outputs 0. In the case of the other values, the level converted with the characteristic (gain value) having the gradient as shown in the drawing is output.

Each of the tone converting unit 40 for edge emphasis and the tone converting unit 42 for correction has a tone conversion LUT (Look Up Table) for each of the RGB colors, and performs tone conversion of the RGB data. The tone conversion LUT is characterized by a γ value as a conversion characteristic.

In the embodiment, the conversion characteristic of the tone converting unit 40 for edge emphasis (hereinbelow, called tone characteristic 40A for edge emphasis) and the conversion characteristic of the tone converting unit 42 for correction (hereinbelow, called tone characteristic 42A for correction) have γ values which vary according to the luminance range of an input image.

Figure 6A:
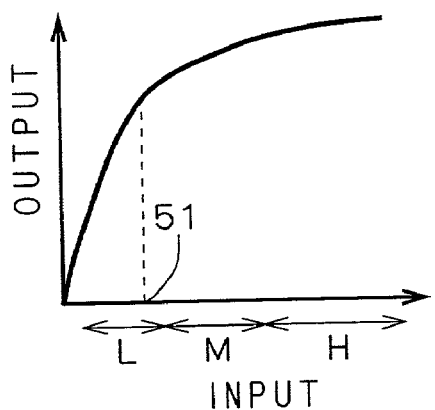
FIGS. 6A to 6C are diagrams showing tone conversion characteristics in which a γ value changes in low, intermediate, and high luminance parts.
Figure 6B:
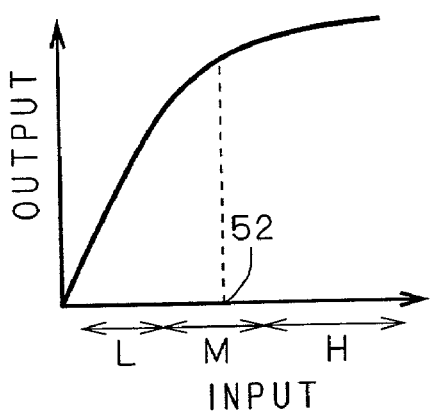
Figure 6C:
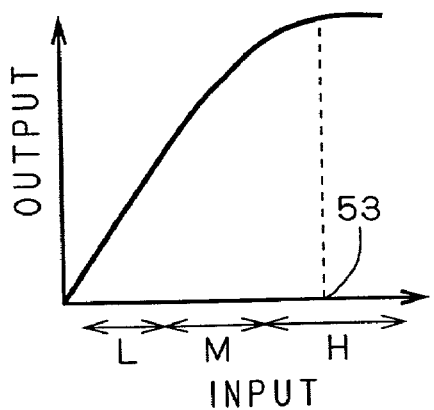

FIGS. 6A to 6C illustrate the conversion characteristics of tone conversion in which the γ value changes. In the diagrams, L, M, and H denote ranges of a low luminance part, an intermediate luminance part, and a high luminance part of input data, respectively. In FIG. 6A, in the range of the low luminance part L, the γ value changes. That is, by using an input signal level 51 in the low luminance part L as a boundary, two different γ values are set.

Similarly, in FIG. 6B, by using an input signal level 52 in the intermediate luminance part M as a boundary, two different γ values are set. In FIG. 6C, by using an input signal level 53 in the range of the high luminance part H as a boundary, two different γ values are set.

As described above, the three tone conversion characteristics shown in FIGS. 6A to 6C are characteristics in which the γ value changes at a certain luminance level as a boundary. The boundaries of change of the γ value are different from each other and are in the low luminance part L, intermediate luminance part M, and high luminance part H.

In the case of performing the tone conversion by using such tone converting characteristics as the tone characteristic 40A for edge emphasis, the luminance range (density range) in which the boundary at which the γ value changes exists exerts an influence on the edge emphasizing process as a next process. That is, by using a conversion characteristic having a plurality of γ values each changing at a certain boundary as the tone characteristic 40A for edge emphasis, the degree of edge emphasis in the luminance range in which the γ value changes can be increased.

In the examples shown in FIGS. 6A to 6C, by selecting a proper γ value before and after each of the boundaries 51, 52, and 53, in the case of FIG. 6A, that is, in the case where the range in which the γ value changes is the low luminance part L, the degree of edge emphasis in the low luminance part L is increased. In the case of FIG. 6B, that is, in the case where the range where the γ value changes is the intermediate luminance part M, the degree of edge emphasis in the intermediate luminance part M is increased. In the case of FIG. 6C, that is, in the case where the range where the γ value changes is the high luminance part H, the degree of edge emphasis is increased in the high luminance part H.

In the embodiment, by applying such conversion characteristics to the tone characteristic 40A for edge emphasis, the edge emphasis according to the scene of an image can be performed.

In contrast, the tone converting unit 42 for correction corrects the tone so as to achieve a proper tone characteristic as an image.

In the description of the general tone conversion characteristics, on the assumption that an image is observed on a monitor finally, the γ value is determined according to the characteristic of a monitor. However, as described above, since the degree of edge emphasis is changed in the tone converting unit 40 for edge emphasis, a value different from the γ value adapted to the final output characteristic of the monitor is set. The tone converting unit 42 for correction therefore corrects the tone characteristic deviated from the monitor characteristic by the process of the tone converting unit 40 for edge emphasis so as to be adapted to the monitor characteristic.

The tone characteristic 42A for correction is therefore unconditionally obtained from the tone characteristic 40A for edge emphasis and the monitor output characteristic of a final image.

Referring again to FIG. 3, a tone characteristic control unit 43 selects the conversion characteristic used in the tone converting unit 40 for edge emphasis on the basis of a result of a scene determining unit 44 to be described hereinlater and controls switching of the conversion characteristic.

A recording image generating unit 37 generates a compression image for recording, adds image information, and records the image into the memory card 20.

<2. Determination of Scene and Tone Characteristic Control>

A scene determining process in the scene determining unit 44 and a control process in the tone characteristic control unit 43 will now be described.

The scene determining unit 44 determines the scene of an image from shooting mode information, distance information (magnifying power of the subject), luminance distribution information, light source detection information, contour detection information, and the like, and outputs the result to the tone characteristic control unit 43.

First, the method of determining a scene from the shooting mode information will be described. The determination from the shooting mode information is performed on the basis of information of the shooting mode explicitly selected by the operation of the operator using the setting keys 16.

FIG. 7 shows an example of the types of scenes. In the digital camera 1 according to the embodiment, six scenes (shooting modes) of "portrait", "landscape", night view", "slow synchro", "macro", and "character mode" are selectable.

When the operator performs a predetermined operation using the setting keys 16, the six scenes are selectably displayed on the liquid crystal monitor 19. By performing the predetermined operation using the setting keys 16, the operator selects one of the scenes.

As described above, the scene determining unit 44 can determine the scene from the shooting mode explicitly set by the operator. Further, in the embodiment, the scene determining unit 44 can determine the scene of an image from information of distance to the subject (magnifying power of the subject), luminance distribution information, light source detection information, contour detection information, person detection information (those are collectively shown as various information 38 in FIG. 3), and the like.

In the method of determining a scene on the basis of the magnifying power of the subject, the scene determining unit 44 obtains the information of the magnifying power of shooting the main subject in focus from a shooting section of the digital camera 1, and determines the scene on the basis of the information. For example, when the magnifying power of the main subject is high, that is, the distance to the subject is short, the "macro" mode or "portrait" mode is determined according to the distance. When the magnifying power of the subject is low, the "landscape" mode is determined.

As another method, an area where the main subject exists is detected from the detection information of a contour (edge) in an image and detection information of the center of gravity of the edge. The occupation ratio between the main subject area and the background area is computed. If the occupation ratio of the main subject is high, the "macro" mode is determined. If the occupation ratio of the main subject is low, the "landscape" mode is determined. In the other cases, the "portrait" mode is determined. As described above, the scene determining unit 44 has the function of determining the scene (mode) by performing image analysis using the various information 38.

The tone characteristic control unit 43 selects the conversion characteristic of the tone converting unit 40 for edge emphasis on the basis of the scene determination result of the scene determining unit 44. Specifically, as shown in FIG. 7, it is optimum to perform edge emphasis of different degrees to scenes (shooting modes), and the tone characteristic 40A for edge emphasis is selected according to the intended degree of edge emphasis. By selecting the tone characteristic 40A for edge emphasis, the tone characteristic 42A for correction is unconditionally determined.

In the embodiment, in the shooting mode of "portrait", the edge emphasis of the "low degree" is performed in all the luminance ranges of the low, intermediate, and high luminance parts. In the two shooting modes of "night view" and "slow synchro", the edge emphasis of the "low degree" is performed in the low luminance part, and the edge emphasis of the "high degree" is performed in the intermediate and high luminance parts. In the three shooting modes of "landscape", "macro", and "character", the edge emphasis of the "high degree" is performed in all the luminance ranges. The reason why the scenes and the degrees of edge emphasis are associated with each other will be described hereinbelow.

The "portrait" mode is a shooting mode in which a person is the subject. It is generally preferred that an image of the skin of a person is finished softly and smoothly.

The "landscape" mode is a shooting mode of shooting a far landscape. Since the subject is minute, the image looks unclear. Consequently, it is preferred that the contrast is emphasized more.

The "night view" mode is a mode of shooting a night view or a person in a night view as a background. Since a dark portion is large, noise has to be removed in the low luminance part.

The "slow synchro" mode is a flash shooting mode of shooting a subject at low shutter speed. When exposure time is increased, noise increases. Consequently, it is necessary to eliminate noise in the low luminance part.

The "macro" mode is a mode of shooting the subject in a close distance. It is preferred to display an image of the subject clearly.

The "character" mode is a shooting mode in which the subject is characters of magazines, books, and so on. It is preferred that the characters are displayed sharply.

The tone characteristic control unit 43 selects the optimum tone characteristic 40A for edge emphasis so as to satisfy the relation between the shooting mode (scene) and the degree of edge emphasis as described above. In the embodiment, as shown in FIGS. 8A to 8C, the three tone characteristics 40A (40A1 to 40A3) to be switched and used by the tone converting unit 40 for edge emphasis are prepared.

Figure 8A:
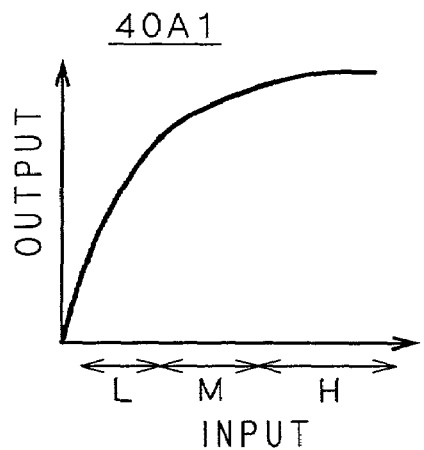
FIGS. 8A to 8C are diagrams showing three kinds of tone conversion characteristics in the embodiment.

In the tone characteristic 40A1 for edge emphasis shown in FIG. 8A, the γ value is constant in the whole range of the low luminance part L, intermediate luminance part M, and high luminance part H. Therefore, in the whole luminance range, the edge emphasis is not made strongly. As shown in Table 7, the tone characteristic 40A1 for edge emphasis is used in the "portrait" mode.

Figure 8B:
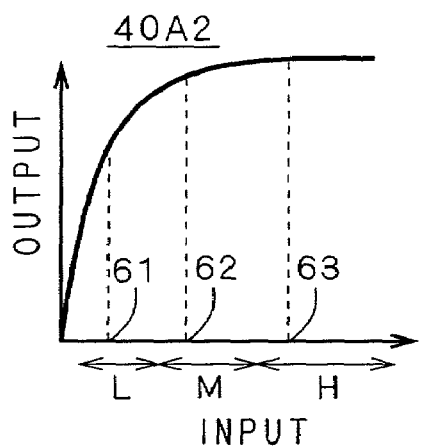

In the tone characteristic 40A or edge emphasis shown in FIG. 8B, the γ value changes at an input signal level 61 in the low luminance part L, at an input signal level 62 in the intermediate luminance part M, and at an input signal level 63 in the high luminance part H. That is, the edge emphasis is strongly placed in the whole luminance range of the low, intermediate, and high luminance parts. That is, as shown in Table 7, the tone characteristic 40A2 for edge emphasis is used in the "landscape", "macro", and "character" modes.

Figure 8C:
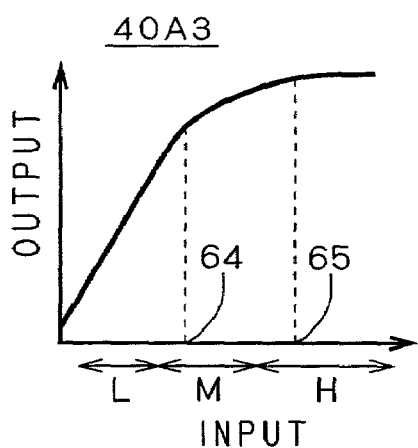

In the tone characteristic 40A3 for edge emphasis shown in FIG. 8C, the γ value changes at an input signal level 64 in the intermediate luminance part M and at an input signal level 65 in the high luminance part H. That is, the edge emphasis of a low degree is placed in the low luminance part, and the edge emphasis of a high degree is placed in the intermediate and high luminance parts. Therefore, as shown in the table of FIG. 7, the tone characteristic 40A3 for edge emphasis is used in the "night view" and "slow synchro" modes.

As described above, the tone converting unit 40 for edge emphasis switchably has the three conversion characteristics 40A. The tone characteristic control unit 43 selects and switches the tone characteristic 40A on the basis of the determination result of the scene determining unit 44.

<3. Process Flow>

The image processing flow including the tone converting and edge emphasizing processes in the digital camera 1 constructed as described above will now be described with reference to FIG. 9.

In step S1, an image signal output from the CCD 14 is transferred via the A/D converting unit 31 and the like ("reading of data" in step S1 in the flowchart is expressed in consideration of the case where a computer is used as an image processing apparatus as will be described hereinlater).

The transferred image signal is subjected to WB correction in the WB correcting unit 33 (step S2) and, further, a process of interpolating a dropped pixel is performed by the pixel interpolating unit 34 (step S3).

Subsequently, a tone characteristic is selected by the tone characteristic control unit 43 (step S4). As described above, when the shooting mode is explicitly selected by the operation of the operator, the determination is made on the basis of the selected shooting mode. Alternately, the determination is automatically made on the basis of luminance distribution information or the like.

By using the conversion characteristic selected in the tone characteristic control unit 43, the tone conversion is performed by the tone converting unit 40 for edge emphasis (step S5). The edge emphasizing process is performed by the edge emphasizing unit 41 (step S6). Since the tone conversion based on the scene determination result is performed by the tone converting unit 40 for edge emphasis, the edge emphasis according to a scene (shooting mode) is made by the edge emphasizing unit 41.

The tone characteristic control unit 43 selects the conversion characteristic in the tone converting unit 42 for correction from the conversion characteristic of the tone converting unit 40 for edge emphasis used in step S5 and the final image characteristic (step S7), and the tone converting process for correction is performed by using the selected conversion characteristic (step S8). In such a manner, the edge emphasizing process according to a scene is performed, and a final image adapted to the monitor output characteristic is output.

The output image data is subjected to a compressing process in the recording image generating unit 37 (step S9) and the resultant data is written into the memory card 20 (step S10).

<4. Comparison of Process by Computation>

A state in which the degree of edge emphasis is changed by using the tone characteristic 40A for edge emphasis in which the γ value changes according to the luminance range will be described with actual computation using sample data.

For simplicity, the edge emphasizing process is performed on a one-dimensional edge shape. Image data is expressed by luminance values of eight bits (0 to 255), and the γ value (γe) of the tone characteristic 40A of the tone converting unit 40 for edge emphasis changes at the luminance level 100 of input image data ie as a border as shown in FIG. 10. Concretely, when ie<100, γe=0.7. When ie≧100, γe=0.3. The edge emphasis is performed by using a spatial filter as shown in FIG. 11 (it is assumed that coring is not carried out here).

As the tone characteristic of a final image, the characteristic shown in FIG. 12 is used. As the tone characteristic of the final image, the γ value (γs) is constant irrespective of the input level, and γs=0.45.

<4-1 Definition of Mathematical Expressions Used for Comparison Calculation>

Necessary expressions will now be defined. The tone characteristic 40A in the tone converting unit 40 for edge emphasis is expressed by Expression 1 when input data is "ie" and output data is "oe".

$$Oe = G \times ie^{\gamma e} \qquad \text{Expression 1}$$

Ge in Expression 1 denotes a constant determined from the maximum value of the input data "ie" and the maximum value of the output data "oe".

When input data is "is" and output data is "os" in the tone characteristic of the final image, Expression 2 is satisfied.

$$OS = Gs \times is^{\gamma s} \qquad \text{Expression 2}$$

Gs in Expression 2 denotes a constant determined from the maximum value of the input data "is" and the maximum value of the output data "os".

When input data of the tone converting unit 42 for correction is "ih" and output data is "oh", the conversion characteristic of the tone converting unit 42 for correction can be expressed as Expression 3 by using γe and γs.

$$Oh = Gh \times ih^{\frac{\gamma s}{\gamma e}} \qquad \text{Expression 3}$$

Gh in Expression 3 is a constant determined from the maximum value of input data "ih" and the maximum value of the output data "oh".

As a concrete example, an edge emphasizing process calculation is executed by using the tone conversion characteristics defined as described above.

When the input data "ie" satisfies the relation 100<ie≦255 (the zone where γ=0.3), the tone characteristic for edge emphasis in FIG. 10 is expressed as Expression 4 by substituting necessary values into Expression 1.

$$Oe = \left(\frac{255}{255^{0.3}}\right) \times ie^{0.3} = 48.4 \times ie^{0.3} \qquad \text{Expression 4}$$

$(100 < ie \leq 255)$

When the input data "ie" satisfies the relation 0≦ie≦100 (the zone where γ=0.7), by substituting necessary values to Expression 1, the tone characteristic is expressed as Expression 5. In order to make the zone where γ=0.7 and the zone where γ=0.3 continuous, it is necessary to determine Ge so that output data becomes 192.7 (=48.4×100$^{0.3}$) when the input data is 100. That is, Ge is calculated from the equation 192.7=Ge×100$^{0.7}$.

$$Oe = \left(\frac{192.7}{100^{0.7}}\right) \times ie^{0.7} = 7.7 \times ie^{0.7} \qquad \text{Expression 5}$$

$(0 \leq ie \leq 100)$

Subsequently, from the tone characteristic for edge emphasis and the tone characteristic of the final image, the tone characteristic for correction is calculated. In order to set the tone characteristic γ of the final image to 0.45, when input data "ih" satisfies the relation 0≦ih≦192.7, the tone characteristic γh for correction has to be expressed by Expression 6. When input data "ih" satisfies the relation 192.7≦ih≦255, the tone characteristic γh for correction has to be expressed by Expression 7.

$$\gamma h = \frac{\gamma s}{\gamma e} = \frac{0.45}{0.7} = 0.64 \qquad \text{Expression 6}$$

$(0 \leq ih \leq 192.7)$ $$\gamma h = \frac{\gamma s}{\gamma e} = \frac{0.45}{0.3} = 1.5 \qquad \text{Expression 7}$$

$(192.7 < ih \leq 255)$

Therefore, if input data is "ih" in the tone characteristic for correction and output data is "oh", when the input data "ih" satisfies the relation 192.7≦ih≦255 (in the zone where γh=1.5), the tone conversion characteristic is expressed by Expression 8.

$$Oh = \left(\frac{255}{255^{1.5}}\right) \times ih^{1.5} = 0.06 \times ih^{1.5} \qquad \text{Expression 8}$$

$(192.7 < ih \leq 255)$

When the input data "ih" satisfies the relation 0≦ih≦192.7 (in the zone where γh=0.64), the tone conversion characteristic is expressed by Expression 9. Gh has to be determined so that output data becomes 160.5 (=0.06× 192.7$^{1.5}$) when input data is 192.7 to make the zone where γh=0.64 and the zone where γh=1.5 continuous. That is, Gh is computed from the equation 160.5=Gh×192.7$^{0.64}$.

$$Oh = \left(\frac{160.5}{192.7^{0.64}}\right) \times ih^{0.64} = 5.5 \times ih^{0.64} \qquad \text{Expression 9}$$

$(0 \leq ih \leq 192.7)$

As described above, in the embodiment, by using the tone conversion characteristic for edge emphasis shown in FIG. 10, the tone conversion characteristics for correction are expressed by Expressions 8 and 9, and FIG. 13 is the plot of the tone conversion characteristic for correction. That is, FIG. 13 shows the tone characteristic 42A for correction.

By using the mathematical expressions defined as above, calculation for comparing the edge emphasizing processes in two sample data having the same contrast and different luminance is executed. FIGS. 14A to 14D are diagrams showing the process on first sample data, and FIGS. 15A to 15D are diagrams showing the process on second sample data. Although the first and second sample data have the same contrast, the luminance of the first sample data is lower than that of the second sample data.

<4-2 Result of Calculation Using First Sample Data>

First, the edge emphasis is calculated by using the first sample data. FIG. 14A shows the edge shape before a process. The horizontal axis denotes the pixel position and the vertical axis indicates a digital value (luminance value). Digital values in pixel positions X1, X2, X3, X4, X5, and X6 are set as f(X1), f(X2), f(X3), f(X4), f(X5), and f(X6), respectively. f(X1), f(X2), f(X3), f(X4), f(X5), and f(X6) in the initial state (before the tone conversion and edge emphasis are performed) are set as d1, d2, d3, d4, d5, and d6, respectively, and it is assumed that in first sample data, d1=d2=d3=40 and d4=d5=d6=60. That is, the first sample data is a set of pixels all having luminance lower than the luminance level of 100 at which the γ value changes in the tone characteristic 40A for edge emphasis.

First, the tone conversion for edge emphasis is performed on the first sample data. When the digital value of input data is smaller than 100 as shown in FIG. 10, γe=0.7 and calculation is executed by using the tone characteristic of Expression 5 as $f(X1)=f(X2)=f(X3)=7.7\times40^{0.7}=101.8$, and $f(X4)=f(X5)=f(X6)=7.7\times60^{0.7}=135.3$. FIG. 14B is the plot of $f(X1)$, $f(X2)$, . . . calculated as described above.

Subsequently, the edge emphasis is calculated by using the spatial filter shown in FIG. 11. The spatial filter is a filter for extracting an edge by multiplying the pixel value (luminance value) of a target pixel by three times and subtracting the pixel values of pixels on both sides of the target pixel from the resultant. Therefore, for example, when the spatial filter is used for $f(X2)$, the luminance value after the process is computed by $-f(X1)+3f(X2)-f(X3)$. By performing a similar process on the other pixels, it is calculated as $f(X2)=101.8$, $f(X3)=68.3$, $f(X4)=168.8$, and $f(X5)=135.3$. FIG. 14C is the plot of $f(X2)$, $f(X3)$, . . . calculated as described above.

After that, the tone conversion for correction is performed. Since each of all the pixel values obtained by the calculation of edges is smaller than 192.7, the tone characteristic 42A for correction is expressed by Expression 9. By substituting the pixel values obtained by the edge calculation into the input data "ih" in Expression 9, it is calculated as $f(X2)=106.0$, $f(X3)=82.1$, $f(X4)=146.5$, and $f(X5)=127.2$. FIG. 14D is the plot of $f(X2)$, $f(X3)$, . . . calculated as above.

<4-3 Result of Calculation Using Second Sample Data>

Figure 15A:
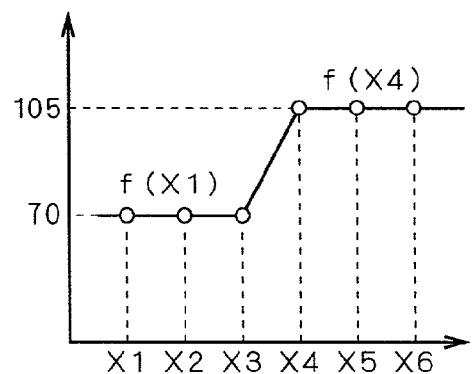
FIGS. 15A to 15D are diagrams showing a process of edge calculation using second sample data.

Subsequently, the edge emphasis is calculated by using the second sample data. FIG. 15A shows the edge shape before a process. Similarly, digital values (luminance values) in pixel positions X1, X2, X3, X4, X5, and X6 are set as $f(X1)$, $f(X2)$, $f(X3)$, $f(X4)$, $f(X5)$, and $f(X6)$, respectively. It is assumed that in second sample data, $d1=d2=d3=70$ and $d4=d5=d6=105$. That is, the second sample data has an edge component in the luminance range in which the γ value changes in the tone characteristic 40A for edge emphasis (the γ value before the luminance level 100 and that after the luminance level 100 are different from each other).

Figure 15B:
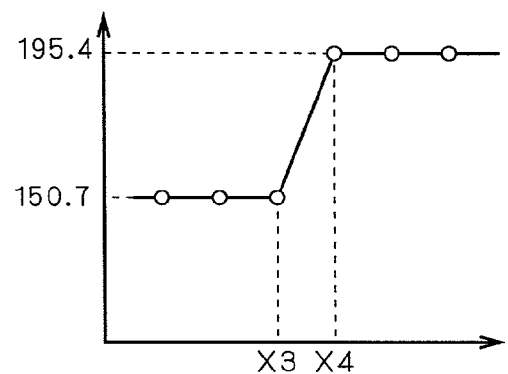

First, the tone conversion for edge emphasis is performed on the second sample data. As shown in FIG. 10, the value of γe changes at the luminance value 100 of input data as a boundary, so that d1, d2, and d3 are calculated by using the tone characteristic of Expression 5, and d4, d5, and d6 are calculated by using the tone characteristic of Expression 4. It is calculated as $f(X1)=f(X2)=f(X3)=7.7\times70^{0.7}=150.7$, and $f(X4)=f(X5)=f(X6)=48.4\times105^{0.3}=195.4$. FIG. 15B is the plot of $f(X1)$, $f(X2)$, . . . calculated as described above.

Figure 15C:
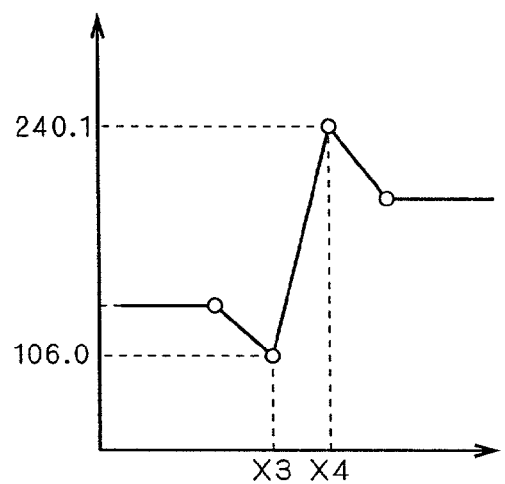

Subsequently, calculation of the edge emphasis is executed by using the spatial filter illustrated in FIG. 11. By executing calculation similar to calculation executed on the first sample data, it is calculated as $f(X2)=150.7$, $f(X3)=106.0$, $f(X4)=240.1$, and $f(X5)=195.4$. FIG. 15C is the plot of $f(X2)$, $f(X3)$, . . . calculated as described above.

Figure 15D:
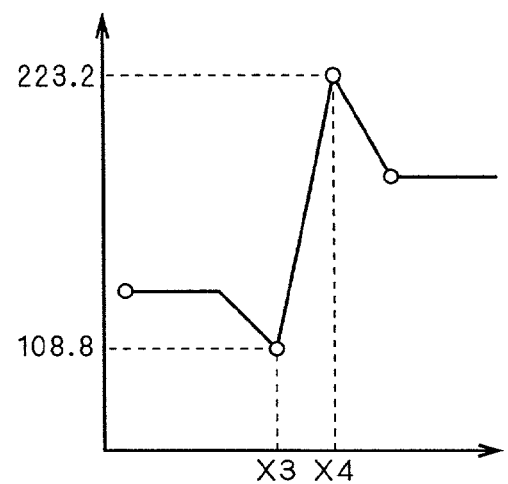

After that, the tone conversion for correction is performed. Since each of $f(X2)$ and $f(X3)$ among the pixel values obtained by the calculation of edges is smaller than 192.7, as the tone conversion characteristic for correction, Expression 9 is used. Since each of $f(X4)$ and $f(X5)$ is larger than 192.7, as the conversion characteristic for correction, Expression 8 is used. By substituting the pixel values obtained by the edge calculation as the input data "ih" into Expressions 8 and 9, it is calculated as $f(X2)=136.3$, $f(X3)=108.8$, $f(X4)=223.2$, and $f(X5)=163.9$. FIG. 15D is the plot of $f(X2)$, $f(X3)$, . . . calculated as above.

<4-4 Comparison of Result of Calculation Using First and Second Sample Data>

The tone converting process for edge emphasis, edge emphasizing process, and tone converting process for correction are performed on the first and second sample data. As a result, as understood by comparing FIGS. 14D and 15D, in both of the cases, the edge emphasis is performed but the degrees of edge emphasis are different from each other.

Specifically, the contrast in a edge rising part is calculated by using Expression 10, Co becomes 0.28 in the first sample data as the contrast of the low luminance edge. Co becomes 0.34 in the second sample data having the contrast of the high luminance edge (which is high relative to the first sample data).

$$Co = \frac{f(X4)-f(X3)}{f(X4)+f(X3)} \quad \text{Expression 10}$$

By comparing the contrast values Co, it is understood that the contrast of the second sample data is higher than that of the first sample data, and the edge is emphasized in the second sample data more than the first sample data. In other words, since the edge component in the second sample data exists in the luminance range in which the γ value in the tone characteristic 40A for edge emphasis changes, the tone conversion by which the edge shape is emphasized more is performed. Since there is a case such that the effect varies according to the γ value which changes (combination), it is necessary to select the proper γ value in accordance with the purpose.

In the example of calculation comparison, the γ value changes from the large value (0.7) to the small value (0.3) at the luminance level 100 as a boundary. Consequently, the edge is more emphasized with respect to the edge components (for example, the second sample data) of the luminance values around the luminance level 100.

The calculation comparison of 4-2 and 4-3 relates to the calculation process using one-dimensional signals (edge shape) as an example. When the calculation is applied to the input image (two-dimensional signal) of the digital camera 1 in the foregoing embodiment, a similar effect is obtained.

Specifically, the tone converting process using the tone characteristics 40A1 to 40A3 for edge emphasis shown in FIGS. 8A to 8C is performed on an input image (RGB data) and, after that, the edge emphasizing process is executed.

As the tone characteristic 42A for correction shown in FIG. 13 is obtained in correspondence with the tone characteristic 40A of FIG. 10, tone characteristics for correction corresponding to the tone characteristics 40A1 to 40A3 for edge emphasis are obtained, and the tone converting process for correction is performed by using the tone characteristics for correction. By the above, the edge emphasizing process according to the luminance range which satisfies the relation between the shooting mode and the degree of edge emphasis shown in FIG. 7 is realized, and image data adapted to the monitor output characteristic is output.

<5. Modification>

In the foregoing embodiment, the processing units (WB correcting unit 33, pixel interpolating unit 34, edge emphasis adjusting unit 36, and the like) of the digital camera 1 may be realized by hardware or software.

By realizing the processes by software, the processes executed in the digital camera 1 according to the embodiment can be performed by a general computer. The program for executing such processes may be recorded on a recording medium and the recording medium may be distributed.

Figure 16:
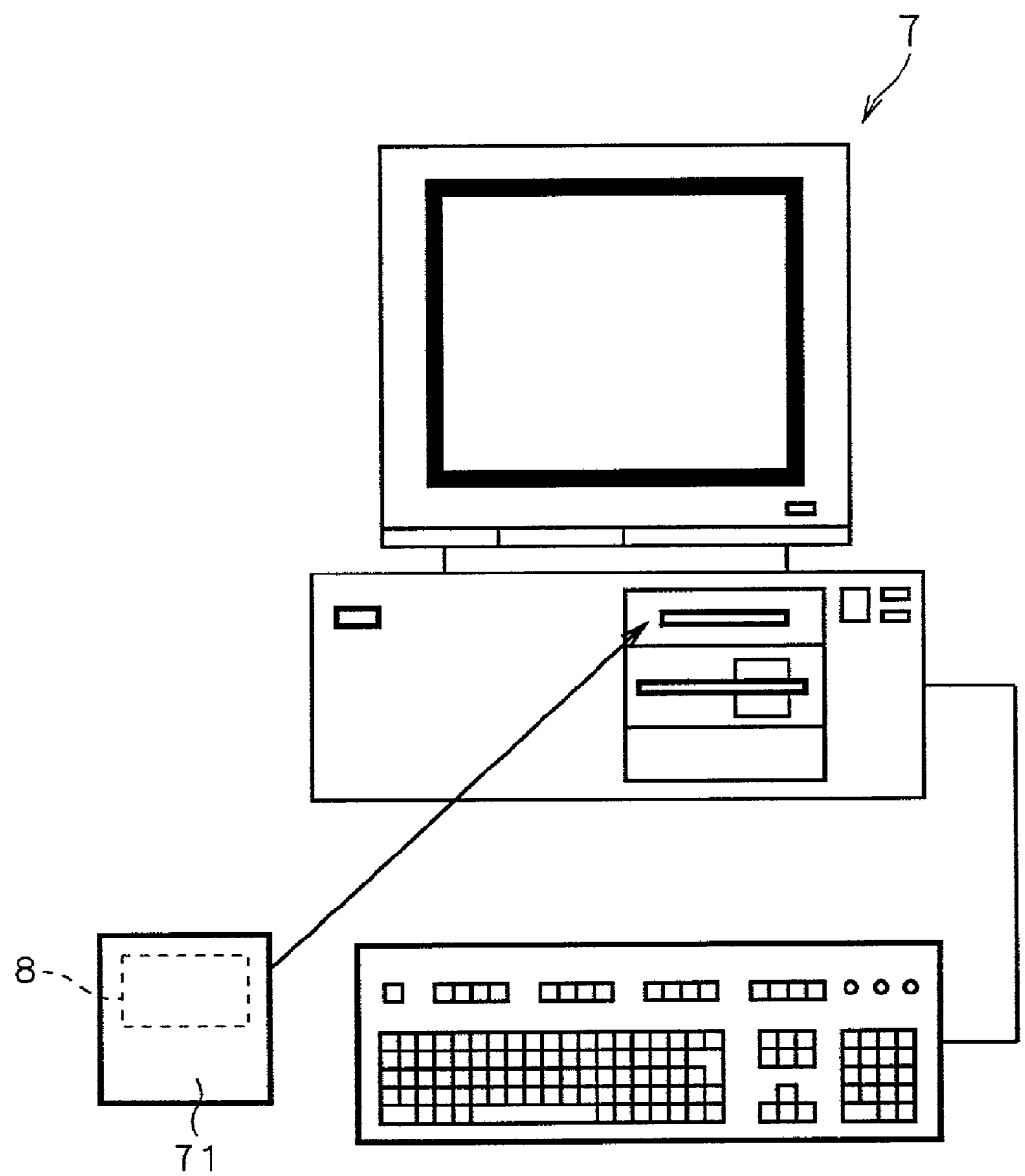
FIG. 16 is a schematic diagram of a computer.

FIG. 16 is a schematic diagram of a computer 7. The computer 7 is, for example, a personal computer, and can read a recording medium 71 such as a floppy disk or a CD-ROM.

By recording a program 8 capable of performing an image process similar to that of the digital camera 1 according to the embodiment into the recording medium 71, the computer 7 can install the program 8 into the hard disk and execute it. Alternately, the program 8 recorded on the recording medium 71 may be directly executed.

Figure 9:
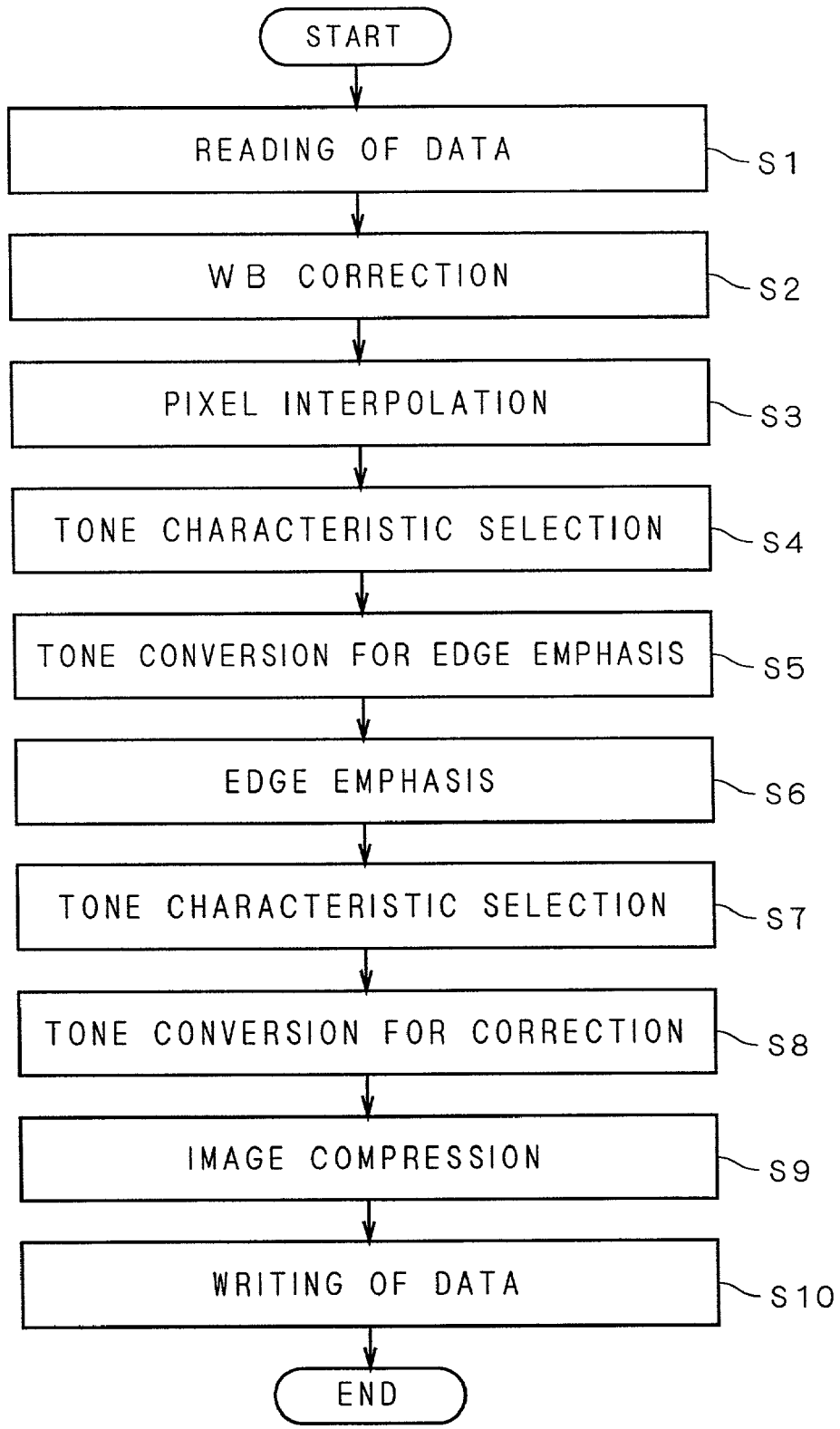
FIG. 9 is a flowchart of an edge emphasis adjusting process in the preferred embodiment.

The processing flow of the program 8 executed by the computer 7 is substantially the same as that in the digital camera 1 shown in FIG. 9. Only processes different from the processes in the digital camera 1 will be described. First, in step S1, the computer 1 reads out RGB data from a predetermined directory of a memory device (such as a hard disk). After all image processes are finished, in step S10, a process of writing processed image data again to a memory device such as a hard disk is performed. The other processes are similar to those in steps S2 to S9 processed by the digital camera 1. A pixel interpolating process is performed in step S3 on the assumption that RGB data to be processed by the computer 1 is data output from a CCD of a Bayer matrix. Therefore, when there are no drop-out pixels in the RGB data to be processed, the process of step S3 is unnecessary.

While the invention has been described in detail, the foregoing description is in all aspects illustrative and not restrictive. It is understood that numerous other modifications and variations can be devised without departing from the scope of the invention.

What is claimed is:

1. An image processing apparatus comprising:
    (a) a first tone converter for performing tone conversion on an input image, said first tone converter having a plurality of conversion characteristics, each conversion characteristic having a different plurality of luminance ranges for which gamma values differ;
    (b) an edge emphasizing circuit for controlling a degree of emphasis on an edge portion in an image subjected to said tone conversion by using a tone conversion characteristic of said first tone converter; and
    (c) a second tone converter for performing tone conversion on said image subjected to a control of said degree of emphasis on said edge portion performed by said edge emphasizing circuit.

2. The image processing apparatus according to claim 1, wherein each of said conversion characteristics is a tone conversion characteristic wherein the gamma values vary according to a luminance of the input image.

3. The image processing apparatus according to claim 2, wherein said first tone converter switches said gamma values in a luminance range in which said degree of emphasis on said edge portion is to be increased.

4. The image processing apparatus according to claim 3, wherein said first tone converter makes contrast of an image in said luminance range in which said degree of emphasis on said edge portion is to be increased higher than contrast of an image in another luminance range.

5. The image processing apparatus according to claim 1, further comprising:
    (d) a scene determining unit for determining a shooting scene of said input image; and
    (e) a selector for selecting a conversion characteristic adapted to said shooting scene determined by said scene determining unit.

6. The image processing apparatus according to claim 5, wherein said scene determining unit determines said shooting scene on the basis of a shooting condition of said input image.

7. The image processing apparatus according to claim 6, wherein said shooting condition is a shooting mode manually set.

8. The image processing apparatus according to claim 1, wherein said second tone converter performs said tone conversion so that said image subjected to a control of said degree of emphasis on said edge portion has a tone characteristic adapted to an image reproducing apparatus.

9. The image processing apparatus according to claim 1, wherein said image processing apparatus is a camera.

10. The image processing apparatus according to claim 1, wherein said second tone converter performs tone conversion by using a conversion characteristic determined by the conversion characteristic of said first tone converter.

11. An image processing method for performing tone conversion on an input image, comprising the steps of:
    (a) performing a first tone conversion by selecting a conversion characteristic from a plurality of conversion characteristics, each having a different plurality of luminance ranges for which gamma values differ;
    (b) performing edge emphasis on said image subjected to said first tone conversion; and
    (c) performing a second tone conversion on said image subjected to said edge emphasis.

12. A computer readable medium having stored thereon computer executable instructions which when executed by a computer, performs the steps of:
    (a) performing tone conversion on an input image by selecting a conversion characteristic from a plurality of conversion characteristics, each having a different plurality of luminance ranges for which gamma values differ;
    (b) controlling a degree of emphasis on an edge portion in said image subjected to said tone conversion by using said plurality of gamma values; and
    (c) performing tone conversion on said image subjected to a control of said degree of emphasis on said edge portion.

13. Apparatus for processing a digital image, the apparatus comprising:
    a first tone converter configured to apply different tone conversions to different portions of an input image, said different portions being determined by the luminance thereof;
    an edge emphasizing circuit configured to apply different degrees of edge emphasis to the different portions of the input image after processing by the first tone converter; and
    a second tone converter configured to apply different tone conversions to the different portions of the input image after processing by the edge emphasis circuit.

14. The apparatus according to claim 13, wherein the different tone conversions are applied to the different portions responsive to a luminance of the different portions.

15. The apparatus of claim 14, wherein said first tone converter applies tone conversions selected to enhance operation of the edge emphasis circuit.

16. The apparatus of claim 15, wherein said second tone converter applies tone conversion selected to adapt the image to an output device.

* * * * *